United States Patent [19]
Stenton et al.

[11] Patent Number: 5,929,992
[45] Date of Patent: Jul. 27, 1999

[54] COMPACT INTERFEROMETRIC TEST SYSTEM FOR ELLIPSES

[75] Inventors: Conrad Stenton; Eric Ao, both of Midland, Canada

[73] Assignee: Raytheon Company, Lexington, Mass.

[21] Appl. No.: 09/132,879

[22] Filed: Aug. 11, 1998

[51] Int. Cl.[6] .................................................. G01B 9/02
[52] U.S. Cl. ............................................ 356/359; 356/358
[58] Field of Search ...................................... 356/358, 359

[56] References Cited

U.S. PATENT DOCUMENTS

| | | | |
|---|---|---|---|
| 5,155,554 | 10/1992 | Schnable et al. | 356/359 |
| 5,283,629 | 2/1994 | Day et al. | 356/359 |
| 5,625,454 | 4/1997 | Huang et al. | 356/359 |

*Primary Examiner*—Robert H. Kim
*Assistant Examiner*—Andrew H. Lee
*Attorney, Agent, or Firm*—W. C. Schubert; G. H. Lenzen, Jr.

[57] ABSTRACT

A method and apparatus for testing elliptical mirrors is provided which reduces the length of the test apparatus by half, provides for precise location of the focus of the interferometer beam, and precise measurement of the distance between foci of the elliptical mirror under test. A small reflective sphere (10) with an optical passageway (15) through its center is used to locate the focal point ($f_2$) of the interferometer (5) within interferometric precision. A plane mirror (30) is placed half way between the focal points of the ellipse (20) under test with one of the elliptical foci coincident with the interferometer focal point ($f_2$). The elliptical mirror (20) under test is placed with reflective concave surface facing away from the interferometer (5) to receive light reflected from the plane mirror (30). The optical passageway (15) is sized to emit a volume of light to fill the elliptical mirror surface (22) after reflection from the plane mirror (30). The optical passageway (15) is also sized for the sphere (10) to reflect substantially all of the light incident upon it from the ellipse (20).

6 Claims, 2 Drawing Sheets

COMPACT INTERFEROMETRIC TEST SYSTEM FOR ELLIPSES

FIELD OF THE INVENTION

The present invention relates to methods and apparatus for interferometric testing of ellipses.

BRIEF DESCRIPTION OF THE PRIOR ART

Elliptical mirrors are used in a variety of applications and instruments including telescopes. For optimum performance in these applications, the elliptical mirror should ideally be free from distortions. For a "perfect" elliptical mirror—one free of distortions—light from one focal point of the ellipse will, after reflection from the ellipse, converge to the other focal point of the ellipse. In contrast, to the extent that the elliptical mirror deviates from a true elliptical shape, no precise focal point can be defined. Thus, an optical image reflected from a distorted elliptical mirror will have aberrations.

A conventional means for testing an elliptical mirror is illustrated in FIG. 1. An interferometer emits a coherent beam of light through an internal beam splitter. One of the beams emerging from the beam splitter is focussed at focal point $f_2$.

If the elliptical mirror $M_1$ under test is positioned such that $f_2$ is at the focal point of the mirror furthest away from its surface, then the light at $f_2$ will diverge spherically toward the mirror and ideally be reflected convergently to the focal point $f_1$ of the mirror nearest to its surface. This is true for a perfect elliptical mirror since, for a perfect ellipse, light passing through one of its focal points must be reflected to the other focal point.

In the conventional test apparatus, a small highly reflective test sphere is placed at the focal point $f_1$. For a perfect elliptical mirror, all of the light convergent on the sphere at $f_1$ from the mirror will be reflected from the sphere back to the surface of the mirror. This light will then be reflected back to the focal point $f_2$. From that point, the light will propagate divergently to the interferometer wherein it is superimposed with a reference beam to create an interferogram. The interferogram is an intensity pattern proportional to the square of the sum of the complex optical field of the reference light and the light returned to the interferometer by the mirror. To the extent that the elliptical mirror is distorted, the interference pattern will deviate from a normal pattern. Typically, the interference pattern is detected by a camera, and the camera image is digitized for subsequent computational evaluation to analyze the intensity pattern to determine the distortions of the elliptical mirror under test.

This test apparatus is sensitive to errors in the correct placement of the elliptical mirror. Because the elliptical focal length is large, a large test table is required, and precise positioning of the elliptical mirror relative to the interferometer and test sphere is difficult. Thus, there is a need for a method and apparatus for testing an elliptical mirror which reduces the test distance required and provides for precise placement of the elliptical mirror.

SUMMARY OF THE INVENTION

Objects of the present invention are, therefore, to reduce the test distance of interferometric testing of ellipses and to measure more precisely the distance between foci.

The method of the present invention comprises calibration of a test apparatus to determine the precise location of the focal point of an interferometer beam, and the precise location to position the elliptical mirror to be tested so that a focal point of the elliptical mirror substantially coincides with the focal point of the interferometer beam.

The precise focal point of an interferometer is determined by using the interference pattern of a small reflective sphere placed at the approximate position of the interferometer focal point. By finely repositioning the sphere and observing the resultant interferogram created by the light reflected from the sphere and the reference beam within the interferometer, correct determination of the focal point can be determined to interferometric precision.

The method of the present invention further comprises positioning a plane mirror away from the focal point of the interferometer beam a distance one-half the distance between focal points of the elliptical mirror to be tested, allowing the test distance to be reduced by about half over prior art methods. To correctly position the mirror, the sphere is removed and a plane mirror is placed at the interferometric focal point as determined above. The mirror is then translated away from the interferometer a distance $$\frac{f_1 - f_2}{2}$$

so that the mirror is positioned precisely halfway between the two focal points of an ellipse with one focal point at the interferometric focal point. Next, a reflective sphere with a small optical passageway through its center is positioned at the interferometric focal point with the optical passageway aligned with the main axis of the interferometric beam. Then, the elliptical mirror, in which an optical passageway is formed through its vertex, is placed between the interferometer and the interferometric focal point. The sphere is sized to completely return the light reflected from the elliptical mirror. The optical passageway through the sphere is sized to pass a volume of light sufficient to fill the ellipse after reflection from the plane mirror. The ellipse is then finely repositioned to obtain the best interferogram possible.

According to this method and apparatus, the test distance is cut in half and the distance between foci can be precisely determined.

These and additional features and advantages of the present invention will become further apparent and better understood with reference to the following detailed description and attached drawings.

DETAILED DESCRIPTION OF THE PREFERRED EMBODIMENTS

Figure 1:
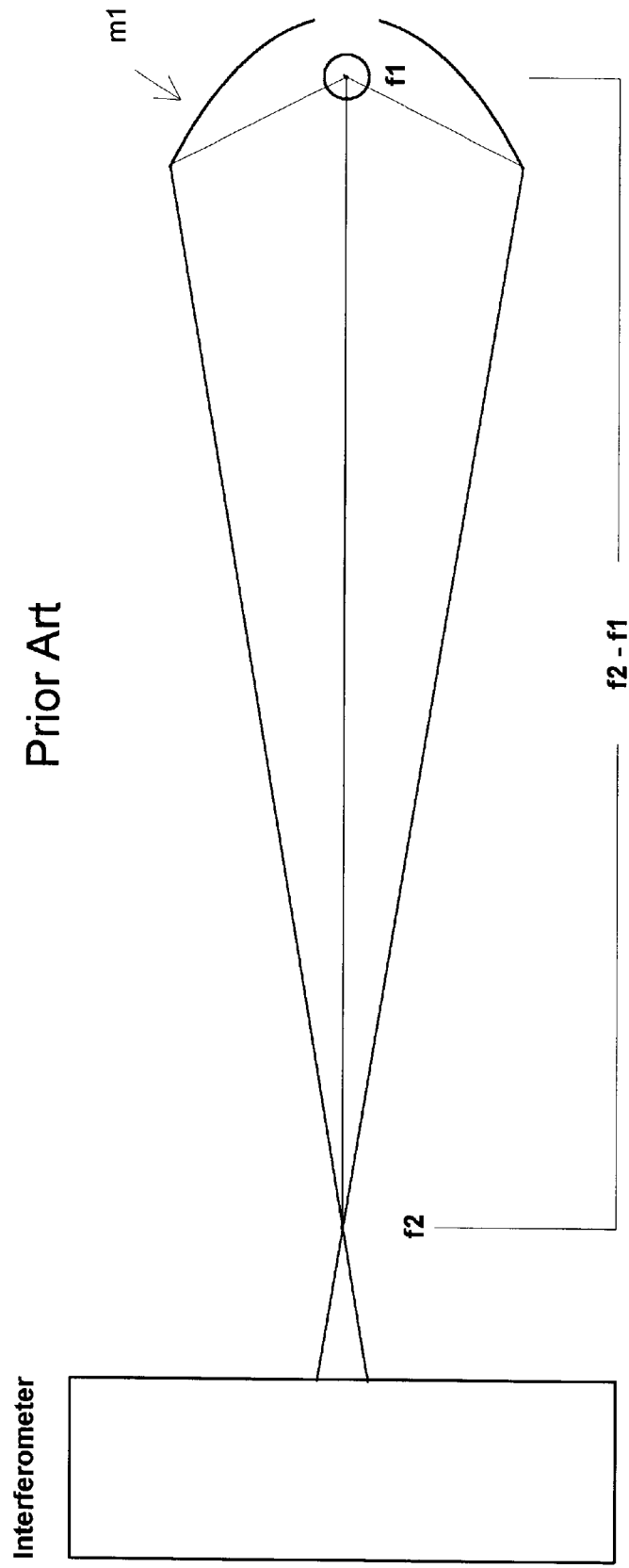
FIG. 1 is a schematic illustration of a prior art method for interferometric testing of ellipse.
Figure 2:
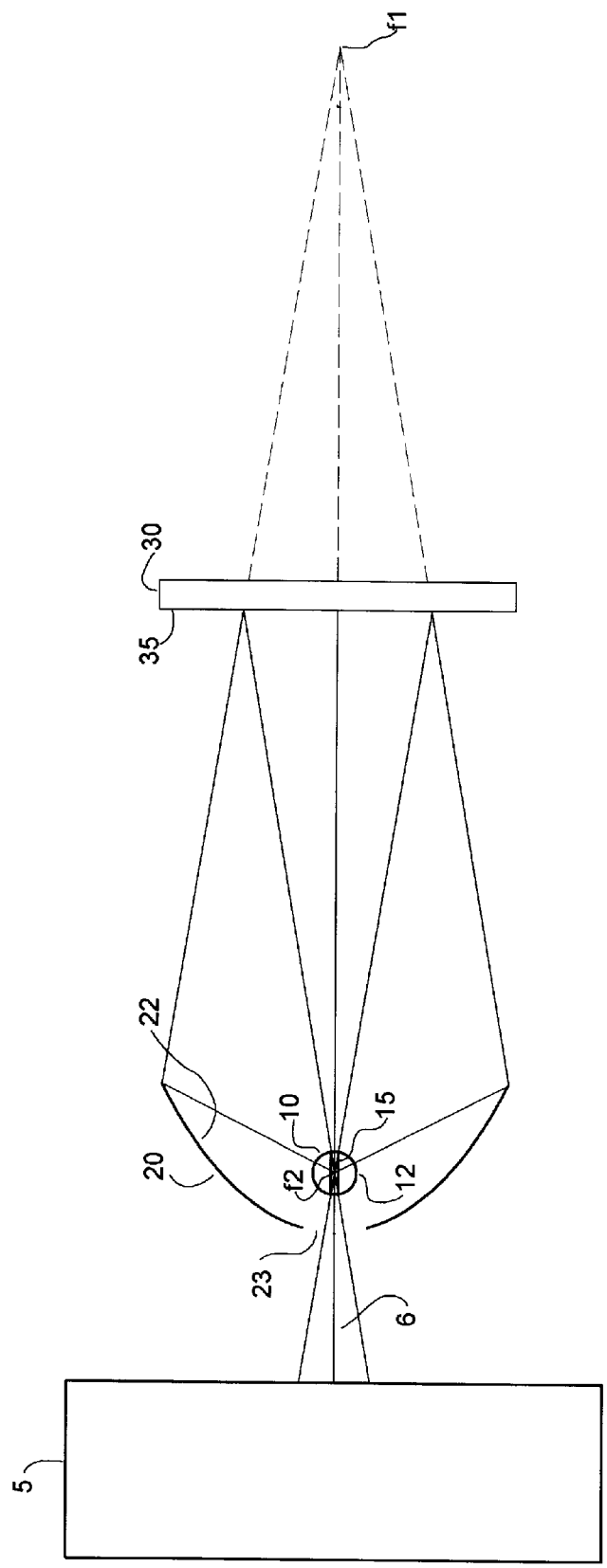
FIG. 2 is a schematic illustration of a preferred embodiment of the present invention.

A preferred embodiment of the present invention is illustrated in FIG. 2, comprising a sphere 10 located at the approximate focal point $f_2$ of the interferometer 5. Interferometer 5 is a conventional apparatus well known in the art. Sphere 10 is a sphere with a highly reflective surface 12 with optical passageway 15 through its center. Optical passageway 15 has a long axis passing through the center of sphere 10 to allow a small volume of light to propagate through sphere 10. Optical passageway 15 may be formed by any one of a variety of manufacturing methods. For example, optical passageway 15 could be formed by boring a small cylindrical hole through sphere 10 to form an optical passageway with a long axis passing through the center of sphere 10. Alternatively, sphere 10 could be formed of material that is optically transparent at the wavelength of the interferometric beam. The surface of sphere 10 could be coated with a highly reflective substance with the exception of small areas on opposite sides of sphere 10 to form an optical passageway with a long axis passing through the center of sphere 10 allowing a small volume of light to pass through sphere 10. Other methods for forming sphere 10 with optical passageway 15 will readily suggest themselves to persons of ordinary skill in the art.

The method of the present invention for testing an elliptical mirror 20 comprises the steps for determining the precise location of focal point $f_2$ using sphere 10. Sphere 10 is placed at the approximate position of focal point $f_2$. Light from interferometer 5 reflects off of the reflective surface of sphere 10. The light reflected from sphere 10 back to interferometer 5 is superimposed upon the reference beam internal to interferometer 5 to create an interferogram indicative of the extent to which the position of the center of sphere 10 deviates from the precise location of focal point $f_2$ of the interferometer beam of interferometer 5. By finely repositioning sphere 10 with reference to the interferogram created by light reflected therefrom, sphere 10 can be positioned concentric to focal point $f_2$ within interferometric precision. Thus, the precise location of focal point $f_2$ can be determined.

The preferred embodiment of the present invention illustrated in FIG. 2 further comprises a plane mirror 30. Plane mirror 30 is preferably mounted on a translation stage (not shown) allowing plane mirror 30 to be positioned along a horizontal axis parallel to the main axis 6 of the interferometric beam. Plane mirror 30 is oriented vertically so that the main axis 6 of the interferometric beam is perpendicular to the reflective plane surface 35 of plane mirror 30. Reflective surface 35 of plane mirror 30 faces toward interferometer 5. The method of the present invention for testing elliptical mirror 20 comprises steps for first accurately positioning plane mirror 30 halfway between $f_2$ and the point $f_1$, which is the focal point of a perfect ellipse having its other focal point at $f_2$. First, plane mirror 30 is placed at the precisely determined focal point $f_2$ with sphere 10 removed. Plane mirror 30 is then translated away from $f_2$ a distance $$\frac{f_1 - f_2}{2}.$$

Sphere 10 is then reintroduced at focal point $f_2$ with the long axis of the optical passageway 15 aligned with the main axis 6 of the interferometer beam. Sphere 10 is sized such that some light from interferometer 5 will be reflected from sphere 10 back to interferometer 5 to achieve precise repositioning of sphere 10 to interferometric precision as explained above.

The elliptical mirror 20 to be tested is now positioned between interferometer 5 and focal point $f_2$ with reflective concave surface 22 facing toward focal point $f_2$. Elliptical mirror 20 has an optical passageway 23 centered at its vertex to allow light to pass therethrough. Elliptical mirror 20 is then finely repositioned to obtain the best achievable interferogram. The best achievable interferogram is one indicative of an elliptical mirror with the least distortion. For a perfect elliptical mirror, the best achievable interferogram will occur when both focal points of the elliptical mirror coincide with the main axis 6 of the interferometer beam and the focal point of the elliptical mirror nearest to its surface coincides with the focal point of the interferometer beam $f_2$.

Sphere 10 is sized to completely return the light reflected from surface 22 of elliptical mirror 20, whereas the optical passageway 15 is sized to pass the volume of light required to fill elliptical surface 22 after reflection from plane mirror 30.

Thus, the apparatus operates as follows: the beam emerging from interferometer 5 passes through a optical passageway 23 centered at the vertex of elliptical mirror 20, enters optical passageway 15 of sphere 10, and converges at focal point $f_2$. The beam then emerges from the opposite end of optical passageway 15 of sphere 10, divergently propagating toward plane mirror 30. Upon reflection from plane mirror 30, the light propagates divergently toward concave surface 22 of elliptical mirror 20. Because plane mirror 30 is located halfway between focal points $f_1$ and $f_2$, light from plane mirror 30 toward elliptical surface 22 propagates as if it were diverging from focal point $f_1$. Thus, upon reflection from elliptical surface 22, the light will converge toward $f_2$. Upon reflection from sphere 10, the light reflected back toward elliptical surface 22 will be reflected convergently by elliptical surface 22 toward plane mirror 30. From plane mirror 30, the light is reflected convergently toward focal point $f_2$ through optical passageway 15 of sphere 10. The light emerges divergently from optical passageway 15 toward interferometer 5. Within interferometer 5, the returning light is superimposed with the reference beam to create an interferogram indicative of the extent to which the elliptical surface 22 deviates from a true elliptical surface.

Simultaneously, a portion of the light from interferometer 5 is reflected from sphere 10 directly back to the interferometer 5 and is also mixed with the reference beam. Thus, the interferogram indicative of the position of sphere 10 can be observed simultaneously with the interferogram indicative of distortion of elliptical mirror 20 under test. This enables the operator of the test apparatus to ensure that sphere 10 remains concentric with focal point $f_2$ during the test procedure.

While this invention has been described with reference to the foregoing preferred embodiments, the scope of the present invention is not limited by the foregoing written description. Rather, the scope of the present invention is limited only insofar as defined by the following claims and equivalents thereof.

We claim:

1. An apparatus for testing an elliptical mirror comprising:
    a sphere with a reflective surface and with an optical passageway through its center;
    an interferometer with a beam that converges to a focal point, wherein a main axis of the beam of the interferometer passes through the focal point;
    a plane mirror positioned away from the focal point of the interferometer a distance one half the distance between focal points of the elliptical mirror to be tested;
    said sphere concentric with the focal point of the interferometer beam and with the optical passageway aligned with the main axis of the beam of the interferometer; and
    wherein the elliptical mirror to be tested is positioned between the interferometer and the sphere with the concave surface of the elliptical mirror facing away from the interferometer, such that an interferogram indicative of an elliptical mirror of least distortion is obtained.

2. The apparatus of claim 1, wherein the optical passageway is small enough for the sphere to reflect all of the light incident upon it from the elliptical mirror; and large enough to pass a volume of light that will fill the elliptical mirror upon reflection from the plane mirror.

3. The apparatus of claim 1, wherein the optical passageway is small enough that some of the light from the interferometer beam is reflected from the sphere back toward the interferometer to provide an interferogram indicative of the extent of deviation of the center of the sphere from the focal point of the interferometric beam.

4. A method for testing an elliptical mirror comprising the steps of:

provinding a sphere with a reflective surface and with an optical passageway through its center;

providing an interferometer with a beam that converges to a focal point, wherein a main axis of the beam of the interferometer passes through the focal point;

positioning the sphere concentric with the focal point of the interferometer beam within interferometric precision as indicated by an interferogram produced thereby; said sphere positioned with the optical passageway aligned with the main axis of the beam of the interferometer;

positioning a plane mirror away from the focal point of the interferometer beam a distance one-half the distance between focal points of the elliptical mirror to be tested, with a reflective surface of the plane mirror facing toward the interferometer and perpendicular to the main axis of the beam of the interferometer; and positioning the elliptical mirror to be tested between the interferometer and the sphere with the concave surface of the elliptical mirror facing away from the interferometer, such that an interferogram indicative of an elliptical mirror of least distortion is obtained.

5. The method of claim 4, wherein the optical passageway is small enough for the sphere to reflect substantially all of the light incident upon it from the elliptical mirror; and large enough to pass a volume of light that will fill the elliptical mirror upon reflection from the plane mirror.

6. The method of claim 4, wherein the optical passageway is small enough that some of the light from the interferometer beam is reflected from the sphere back toward the interferometer to provide an interferogram indicative of the extent of deviation of the center of the sphere from the focal point of the interferometric beam.

* * * * *